United States Patent [19]

Brown et al.

[11] 4,432,768
[45] Feb. 21, 1984

[54] MEDICINAL FLUID APPLICATOR

[75] Inventors: Jack B. Brown, Granada Hills, Calif.; Wijnand J. Bischoff, Olds, Canada

[73] Assignee: Banner Gelatin Products Corp., Chatsworth, Calif.

[21] Appl. No.: 419,229

[22] Filed: Sep. 17, 1982

[51] Int. Cl.³ .............................................. A61M 5/00
[52] U.S. Cl. ................................................. 604/200
[58] Field of Search ............... 604/200, 204, 205, 187, 604/87, 148, 202, 203, 212

[56] References Cited

U.S. PATENT DOCUMENTS

| | | |
|---|---|---|
| 1,880,354 | 10/1932 | Mueller . |
| 2,552,100 | 3/1949 | Leonetti et al. . |
| 2,805,662 | 9/1957 | Lawshe et al. ....................... 604/204 |
| 3,105,614 | 10/1963 | Sherbondy . |
| 3,698,390 | 10/1972 | Ferris . |
| 3,757,781 | 9/1973 | Smart . |
| 4,020,838 | 5/1977 | Phillips et al. . |
| 4,060,083 | 11/1977 | Hanson . |
| 4,273,258 | 6/1981 | Stevenson . |

FOREIGN PATENT DOCUMENTS

| | | | |
|---|---|---|---|
| 89997 | 2/1961 | Denmark ........................... | 604/200 |
| 950586 | 9/1949 | France ............................... | 604/200 |

*Primary Examiner*—John D. Yasko
*Attorney, Agent, or Firm*—Fulwider, Patton, Rieber, Lee & Utecht

[57] ABSTRACT

A medicinal fluid applicator is provided particularly for use with a compressible fluid-filled capsule. The medicinal fluid applicator comprises a frame defining a capsule recess for receiving the capsule. A pressure arm is hingedly attached to the frame for movement toward the capsule to apply pressure thereto. A cutting means depends from the pressure arm to sever the capsule when the arm is moved toward the capsule so fluid will squirt from the capsule upon application of pressure from the pressure arm.

5 Claims, 5 Drawing Figures

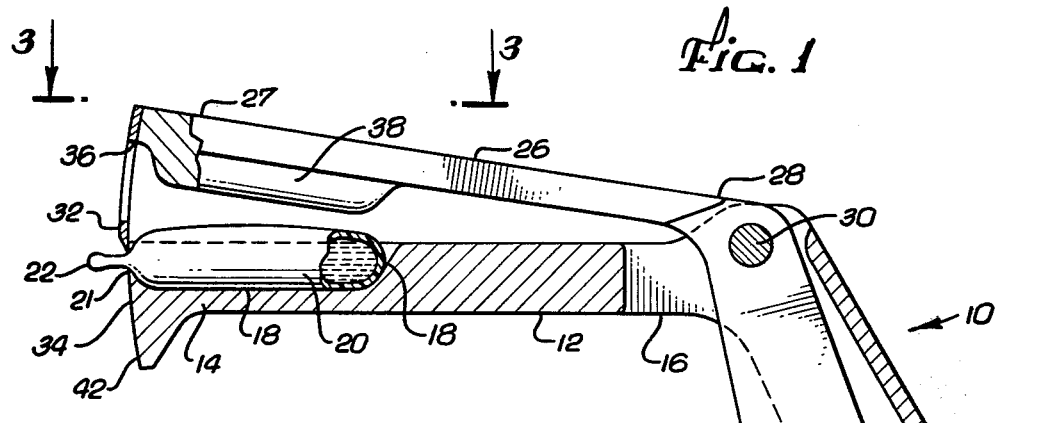
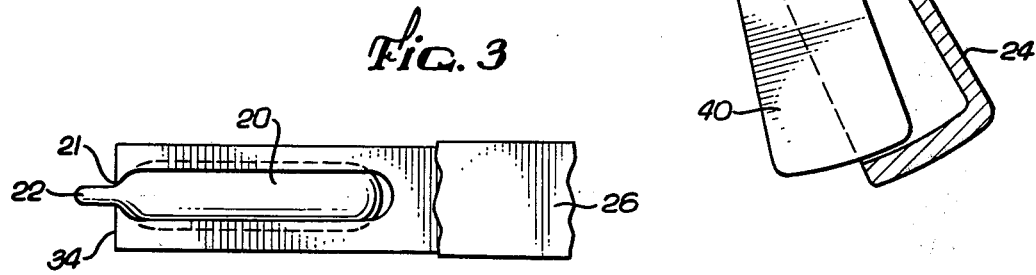
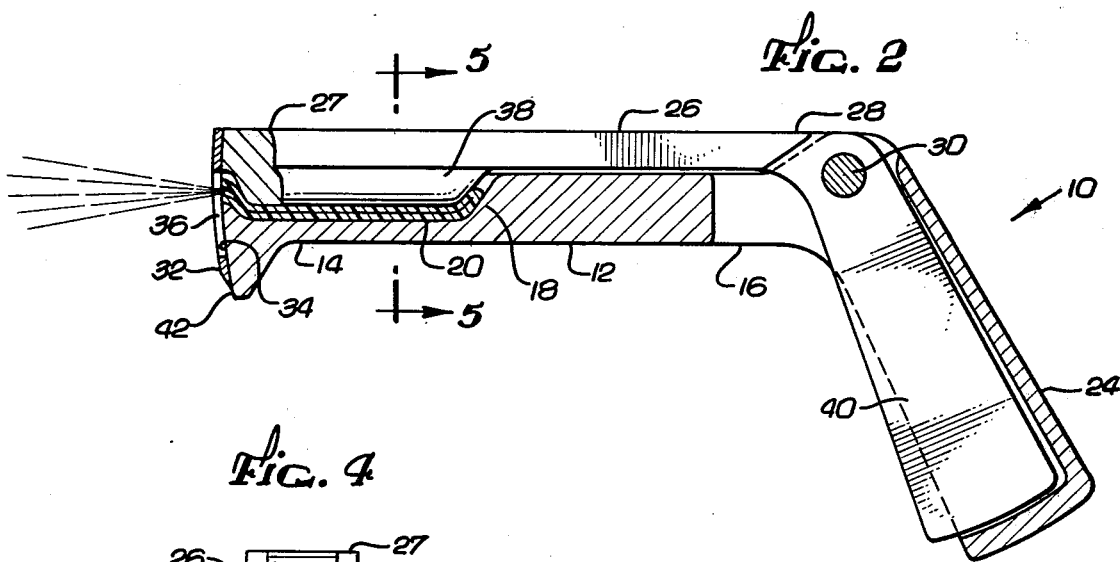
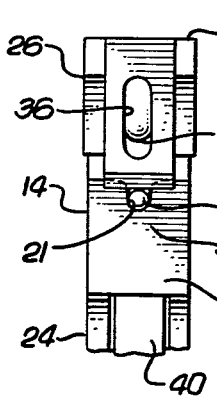
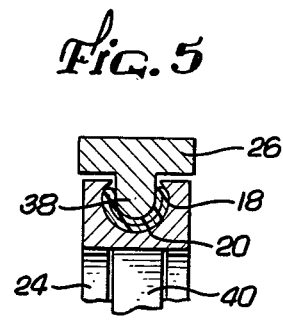

MEDICINAL FLUID APPLICATOR

BACKGROUND OF THE INVENTION

The present invention relates generally to fluid applicators for administering fluids to animals, and more particularly, to an improved medicinal fluid applicator for use with a compressible capsule for administering fluids such as a medicine or food supplement into the mouth of an animal.

The prior art discloses fluid applicators which can be used to deliver a premeasured dosage of fluid far into the mouth of an animal. Some of those applicators, however, do not extend far enough into the mouth of the animal and as a result some of the fluid may be expelled and not swallowed. Other applicators may extend far enough into the mouth, but they take too long to discharge the fluid and the animal may not receive all of the fluid if it will not stand still long enough to take it.

Accordingly, there exists a need for an applicator that will reach far enough into the animal's mouth and discharge the fluid quickly enough to ensure that the animal receives it.

SUMMARY OF THE INVENTION

The present invention resides in an improved medicinal fluid applicator for use with a fluid-filled capsule which can be used to quickly discharge a premeasured dosage of medicinal fluid or food supplement from the capsule into the mouth of an animal.

In general, the invention comprises a frame to hold a compressible fluid-filled capsule. A pressure arm is hingedly connected to the frame for movement toward the capsule to apply pressure thereto. A cutting means is associated with the pressure arm such that, as the pressure arm moves toward the capsule, the cutting means can sever the capsule permitting fluid to be squirted therefrom.

In operation, the applicator is inserted into an animal's mouth, and one quick continuous motion of the pressure arm will cause the cutting means to sever the capsule and then immediately compress it to squirt the fluid from the capsule deep into the mouth of the animal.

Other advantages and features of the present invention will be apparent from the following detailed description thereof.

BRIEF DESCRIPTION OF THE DRAWINGS

The accompanying drawings illustrate the invention. In such drawings:

FIG. 1 is a side elevation view of a medicinal fluid applicator embodying the novel features of the present invention, with the pressure arm in the up position before compressing a capsule and with portions broken away to illustrate details thereof;

FIG. 2 is a side elevation view of the medicinal applicator with the pressure arm in the down position compressing a capsule and with portions broken away to illustrate details thereof;

FIG. 3 is a top elevation view of the medicinal applicator generally on line 3—3 of FIG. 1 with portions broken away to illustrate details thereof;

FIG. 4 is a front view of the medicinal applicator.

FIG. 5 is a front elevation view of the medicinal applicator generally on line 5—5 of FIG. 2.

DETAILED DESCRIPTION OF THE PREFERRED EMBODIMENT

As shown in the accompanying drawings, the present invention is embodied in a novel medicinal fluid applicator, designated generally by reference numeral 10. More particularly, as shown in FIG. 1, the preferred embodiment 10 comprises a substantially elongated frame 12 having a distal end 14 and a proximal end 16. The frame 12 provides walls 18 which define a capsule recess which extends longitudinally from the distal end 14 of the frame 12 for receiving a compressible fluid-filled capsule 20 holding a premeasured volume of fluid. The distal end 14 of the frame 12 also defines a tip opening 21 through which the tip 22 formed by the capsule 20 can pass. The proximal end 16 of the frame 12 is provided with a hand grip 24 which extends in a direction generally perpendicular to the frame 12.

A substantially elongated pressure arm 26 having a distal end 27 and a proximal end 28 is attached near its proximal end 28 to the proximal end 16 of the frame 12 and extends in a direction generally parallel to that of the frame 12. A pin 30, extends through aligned openings formed in the proximal end 16 of the frame 12 and the proximal end 28 of the pressure arm 26 to hingedly secure the pressure arm 26 to the frame 12 such that the pressure arm 26 can move toward and away from the capsule 20.

A blade 32 depends from the distal end 27 of the pressure arm 26 such that, when the pressure arm 26 is moved toward the capsule 20, the blade 32 moves along a path adjacent to a front face 34 formed by the frame 12 at the distal end 14 thereof. As shown in FIG. 4, the blade 32 has an opening 36 which becomes aligned with the tip opening 21 when the pressure arm 12 is moved into the capsule recess.

A protruberance 38 depends from the pressure arm 26 adjacent to its distal end 27. As shown in FIG. 2, the protruberance 38 is of a sufficient depth so that it will fully compress a fluid-filled capsule 20 in the capsule recess when the pressure arm 26 is moved down into the frame.

A hand lever 40 depends from the proximal end 28 of the pressure arm 26 in a direction generally perpendicular to the pressure arm 26 and at a slight angle to the hand grip 24 joined to the proximal end of the frame 12. The hand lever 40 passes through an opening in the frame 12 to accommodate the movement thereof.

A portion of the front face 34 of the distal end 14 of the frame 12 provides a guard surface 42 comprising an extension of the front face 34 of the frame 12. The blade 32 fits in juxtaposition with the guard surface 42 when the pressure arm 12 is moved down toward the capsule recess 19. The close proximity between the blade 32 and the guard surface 42 will prevent an animal from being cut or otherwise injured by the blade 32.

In use, a compressible fluid-filled capsule 20 having a tip 22 depending therefrom is placed in the capsule recess such that a portion of the tip 22 passes through the tip opening 21 and extends out beyond the front face 34 of the frame 12. The hand grip 24 and hand lever 40 are then grasped and the distal end 14 of the frame 12 containing the capsule 20 is inserted into the mouth of an animal. Hand pressure is then exerted on the hand lever 40 causing it to move toward the hand grip 24, and causing the pressure arm 26 to move toward the capsule recess wherein the capsule 20 is nestled.

As the pressure arm 26 moves toward the capsule 20, the blade 32 moves along a path immediately adjacent to the front face 34 and severs the tip 22 from the capsule 20. As the pressure arm 12 continues to move down, the capsule 20 becomes compressed by protruberance 38, and the fluid therein squirts out the severed tip 32 into the mouth of the animal.

From the foregoing, it will be appreciated that the present invention provides an improved medicinal fluid applicator 10 which can quickly provide a desired dosage of a medicinal fluid or food supplement to an animal. In a single motion, the medicinal fluid applicator 10 can sever the tip 22 from a fluid-filled capsule 20 and cause the fluid therein to quickly squirt from the capsule 20 deep into the mouth of the animal being treated.

While one particular form of the invention has been illustrated and described, it will be apparent that various modifications and improvements thereto can be made without departing from the spirit and scope of the invention. Accordingly, it is not intended that the invention be limited by the above description, except as set forth in the appended claims.

I claim:

1. A medicinal fluid applicator for discharging fluid from a compressible fluid-filled capsule, comprising:
   a frame for holding said capsule;
   a pressure arm hingedly connected to said frame for movement toward said capsule when held by said frame to apply pressure thereto; and
   a blade depending from said pressure arm for severing said capsule upon movement of said arm toward said capsule held by said frame to permit said fluid to be discharged therefrom by pressure from said arm.

2. A medicinal fluid applicator as defined in claim 1, wherein said blade defines an opening through which fluid can flow after said capsule is severed.

3. A medicinal fluid applicator as defined in claim 3, and further comprising:
   a guard comprising a surface depending from said frame which is in juxtaposition with said blade when said pressure arm is moved toward said frame.

4. A medicinal fluid applicator, for discharging fluid from a compressible fluid-filled capsule, comprising:
   a frame defining a recess to hold the capsule in place;
   a pressure arm hingedly connected to said frame for movement toward and away from said capsule recess;
   a blade depending from said pressure arm for severing said capsule when said pressure arm moves toward the capsule when held by said recess;
   a protruberance projecting from said pressure arm to compress the capsule against said frame and cause fluid to be expelled therefrom when said arm is moved toward the capsule; and
   a guard comprising a surface depending from said frame which is in juxtaposition with said blade when said pressure arm is moved toward said capsule.

5. A medicinal fluid applicator as defined in claim 6, wherein said pressure arm is hingedly connected to a hand grip provided in said frame and wherein said pressure arm is provided with a hand lever for hingedly moving said arm.

* * * * *

UNITED STATES PATENT OFFICE
CERTIFICATE OF CORRECTION

PATENT NO. : 4,432,768
DATED : February 21, 1984
INVENTOR(S) : JACK B. BROWN and WIJNAND JACOB BISCHOFF It is certified that error appears in the above-identified patent and that said Letters Patent are hereby corrected as shown below:

Column 4, line 6 - change "3" to -- 1 --.

Column 4, line 29 - change "6" to -- 4 --.

Signed and Sealed this

Twelfth Day of June 1984

[SEAL]

Attest:

*Attesting Officer*

GERALD J. MOSSINGHOFF

*Commissioner of Patents and Trademarks*